United States Patent [19]
Ryan

[11] Patent Number: 5,646,798
[45] Date of Patent: Jul. 8, 1997

[54] MOVEABLE CAPSTAN ASSEMBLY FOR SELECTIVELY CONTACTING A MEDIA, WHICH ASSEMBLY INCLUDES A TACHOMETER SENSOR

[75] Inventor: Dennis M. Ryan, Redwood City, Calif.

[73] Assignee: Ampex Corporation, Redwood City, Calif.

[21] Appl. No.: 601,202

[22] Filed: Feb. 14, 1996

[51] Int. Cl.$^6$ .................................................. G11B 5/027
[52] U.S. Cl. ............................................................. 360/85
[58] Field of Search ........................................... 360/85, 95

[56] References Cited

U.S. PATENT DOCUMENTS

| 4,095,758 | 6/1978 | Shroff | 360/96.2 |
| 4,553,182 | 11/1985 | Narita | 360/85 |

*Primary Examiner*—A. J. Heinz
*Attorney, Agent, or Firm*—John G. Mesaros; George B. Almeida; James M. Thomson

[57] ABSTRACT

A translatable capstan/tachometer assembly for use, for example, in transporting a magnetic media in a data record/reproduce apparatus, includes a capstan rotatably coupled to a tachometer unit. The assembly is supported for movement from an initial, unthreaded media position within a threading cavity of a data cassette, to a threaded or locked working position. The media path is arranged so that moving the capstan/tachometer assembly into the threaded position causes the media to wrap around the capstan with a substantial wrap angle. In play, record, jog or variable speed operational modes, movement is provided between a motor/disc assembly and the capstan/tachometer assembly to rotatably drive the capstan. In a high speed shuttle mode, the motor/disc assembly is disengaged but the capstan/tachometer assembly remains in contact with the media, thereby still providing tape speed information via the integral tachometer unit.

17 Claims, 2 Drawing Sheets

MOVEABLE CAPSTAN ASSEMBLY FOR SELECTIVELY CONTACTING A MEDIA, WHICH ASSEMBLY INCLUDES A TACHOMETER SENSOR

BACKGROUND OF THE INVENTION

The present invention relates to capstans for driving a web-like material and in particular to a selectively moveable capstan assembly for driving a magnetic media in a data record/reproduce apparatus.

An inherent requirement for any transport apparatus whose function is to drive a magnetic media and/or similar flexible web-like materials includes some form of capstan and capstan motor for accurately transporting and metering the media at a controlled velocity, in either direction. In general, at present there are two types of capstan assemblies typically in common use in the field of data record/reproduce apparatus.

A first type of capstan assembly is known as a pinch roller/capstan combination, in which a media or web is threaded between a cylindrical capstan and a translatable pinch roller which usually includes a peripheral cylindrical surface of a resilient material. During controlled media motion, which typically is −1 to +3 times normal play speed in a magnetic record/reproduce apparatus, the media is urged into contact with the capstan by translating the pinch roller into contact with the capstan with a solenoid, lever, or other means. Such a capstan assembly requires little or no wrap of the media about the capstan since the media is firmly pressed against the capstan by the pinch roller to thereby prevent the possibility of slippage between the media and driving capstan. This assembly also permits decoupling the media or web from the capstan in situations where the media is transported at relatively high speeds such as, for example, during a shuttle mode of operation of a record/reproduce apparatus, whereby the capstan does not have to be capable of operating at such high speeds. However, since the capstan is not rotating during such high speed operating modes, it is necessary to derive media speed information from some form of tachometer-equipped timer idler disposed in contact with the media elsewhere along the media path. Such information is needed in order to monitor the amount of media remaining on the media reels, the end of the media, etc.

The above pinch roller/capstan assembly has various disadvantages which include, for example, the need for the additional timer idler to which the tachometer is coupled. Any additional idlers or guides in contact with the media have the potential of causing additional wear, and add to the complexity of the transport design and fabrication. Another disadvantage is the loss of media motion control during high speed media winding modes since the high performance capstan and its associated capstan servo circuit is not available. A still further disadvantage is that the pinching of the media between the capstan and the pinch roller can cause media surface damage, especially if the magnetic surface of, for example, a magnetic media faces the capstan. Thus media surface damage may occur in a pinch roller/capstan assembly due to skidding during media acceleration as well as from surface roughness and contaminants.

A second type of capstan assembly is known as a direct coupled capstan in which a media or web is threaded around a capstan hub and maintains contact with the capstan in all modes of media transport operation. In this assembly, the capstan drives the media during all operational speeds, including high speed media winding modes, in both directions. Typically, such capstans are equipped with means to assure good media contact, which may include some form of a grooved surface to help expel any air entrapped between the media and the capstan, orifices coupled to a vacuum source to encourage media coupling, a resilient material on the peripheral tape bearing surface of the capstan to increase friction with the media, etc. Such capstans typically are of as large a diameter as practical in order to reduce the rotational speed of the capstan when operating at high media speeds. In addition, the media wrap angle on the capstan must be as large as possible to increase friction and minimize slippage, typically near 180 degrees.

The direct coupled capstan assembly has several disadvantages, the first of which is the need for a capstan drive motor capable of high rotational speeds, yet capable of accurate control in the −1 to +3 times normal play speeds. Such requirements add to the complexity and costs of the capstan/motor assembly. Another disadvantage is the increased motor wear resulting from the high speed operation. Still other disadvantages are the media path layout restrictions which result from both the large capstan diameter and the large wrap angle requirements, and further from the need to provide a media path layout wherein the capstan is located on the side of the media opposite to the magnetic surface of the media to prevent media damage. This is a particular concern and problem in cassette-loaded record/reproduce apparatus. Still another problem and associated disadvantage may occur in some types of video record/reproduce apparatus wherein the media layout is such that in order to achieve a large wrap angle on the capstan, two guideposts must be positioned adjacent to the capstan with undesirably large media wrap angles on each guidepost. Such a guidepost arrangement is practical only with relatively sophisticated airlubricated systems of added complexity, and would not be practical or affordable in less sophisticated, less costly transports.

It would be highly desirable to provide a capstan assembly which combines the advantageous features of each of the types of capstan assemblies of previous discussion, while circumventing as many of the disadvantages as possible.

SUMMARY OF THE INVENTION

To this end, the invention contemplates combining certain advantages of the pinch roller/capstan assembly, namely the low motor speed requirement and the flexibility of capstan placement in a cassette-loaded apparatus, with certain advantages of the direct-coupled capstan assembly, namely the continuous coupling between the tachometer-equipped capstan and tape during all operating modes, and capstan location on the side of the media opposite the magnetic surface to prevent media damage. In addition, the invention circumvents other disadvantages of previous mention such as the need for a separate timer idler assembly, the need for additional highly wrapped guideposts to achieve the required large media wrap on the capstan and/or the need for a large diameter capstan.

The capstan assembly of the invention includes the combination of a cylindrical capstan to which is rotatably coupled a digital tachometer. The resulting capstan/tachometer assembly is supported by a moveable support member, whereby the capstan/tachometer assembly selectively may be moved from a first unloaded position, for example, within a threading cavity of a cassette, to a loaded or working position in the transport in which it may be rotatably coupled to a drive motor. The media is carried along with the capstan/tachometer assembly into a locked and stable operating position. The media path layout is configured so that moving the capstan/tachometer assembly into the locked position wraps the media around the circumference of the capstan a desired substantial amount on the order of from 90 to 180 degrees. Further, the capstan is in contact with the side of the media opposite to the magnetic surface, that is, the non-magnetic side.

In the selected modes of transport operation, the capstan/tachometer assembly is driven by a capstan motor which, in preferred embodiments, is coupled to the outer circumference of the capstan via a motor disc/rim drive friction coupling. Either the capstan/tachometer assembly or the motor/disc assembly may be moved to bring them into frictional contact. In tach-locked modes of operation, such as play, record, jog, edit and/or variable play speed modes, the capstan speed is controlled via feedback from the tachometer and a capstan servo circuit. During high speed shuttle operation in either direction, the capstan/tachometer assembly is disengaged from the motor/disc assembly so that the motor does not need to operate at high speed. However the tachometer still is rotated by capstan contact with the media and thus media speed information is provided in all modes of transport operation without need for an additional timer idler.

DESCRIPTION OF THE PREFERRED EMBODIMENTS

Figure 1:
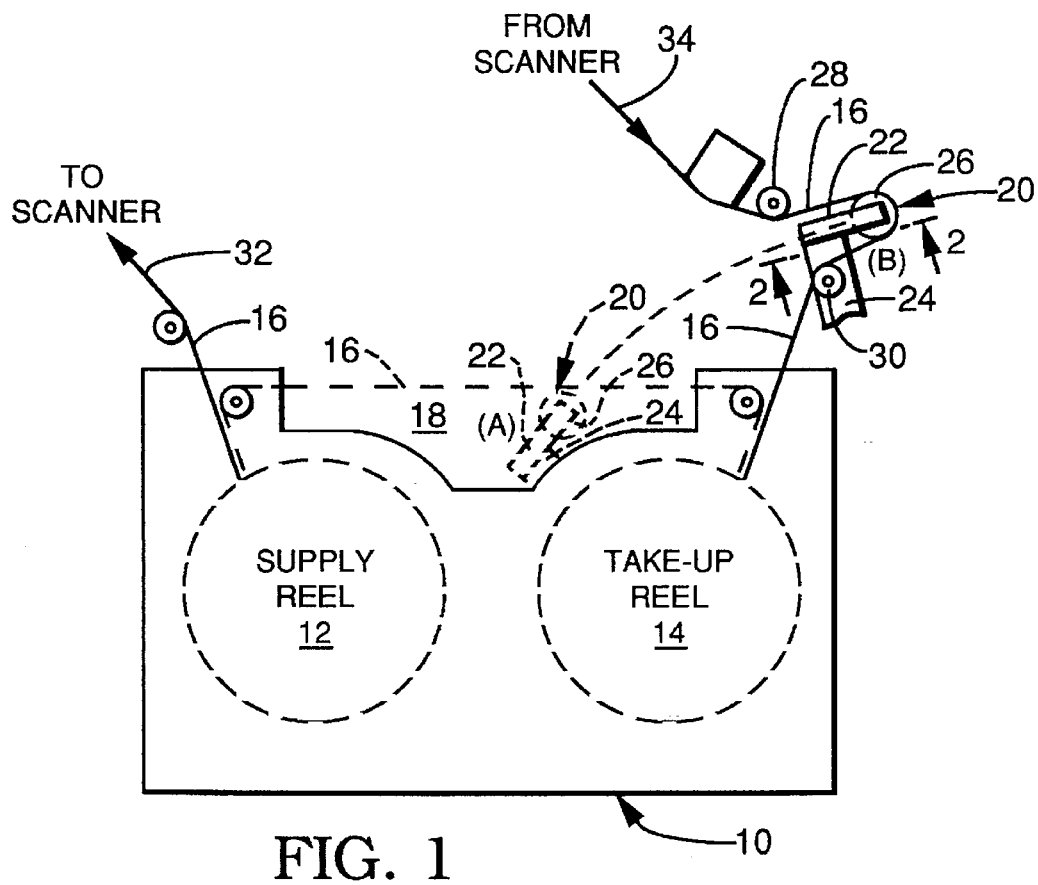
FIG. 1 is a simplified plan view of a data cassette and partial transport mechanism, illustrating the movement of the capstan/tachometer assembly from an initial unthreaded position to a second threaded position.

Referring to FIG. 1, a data cassette 10 is illustrated as loaded in a record/reproduce apparatus (not shown), and includes the usual supply and takeup reels 12, 14 for transporting therebetween a magnetic media 16. The cassette includes a threading cavity 18 in the area immediately behind the length of media extending across the face of the cassette.

The invention includes a capstan/tachometer (tach) assembly 20 secured to a support yoke 22 which in turn is secured to a support member 24. The capstan/tach assembly 20 is positioned inside the threading cavity 18 when the cassette is first loaded in the transport and prior to performing the threading operation (shown in dashed lines). In the embodiment illustrated in FIG. 1, the support member 24 includes a support arm which pivots about a selected pivot point on the transport base (not shown) whereby in the media threading process, the capstan/tach assembly 20 shown in dashed line is moved from an initial position (A) in the cavity 18, to a second threaded position (B) shown in solid lines. In the position (B), the capstan/tach assembly 20 is locked in a media transporting position. In the threading process from position A to position B, the media 16 is engaged by a capstan 26 of the assembly 20, which is further described below. As the assembly 20 and the media 16 are moved to position (B), they pass between guideposts 28, 30 secured to the transport base (not shown), thereby providing a desired media wrap about the capstan 26, which generally is of the order of from 90 to 180 degrees.

Other media threading mechanisms are disposed within the threading cavity 18 prior to the threading process and, as is well known in the art, carry the media into engagement with a scanner drum/rotary head arrangement (not shown) supported within the transport. Since the scanner drum/head arrangement is well known and is not part of this invention, it is not further described herein. It suffices herein that portions 32, 34 of the media 16 are illustrated in FIG. 1 as extending respectively to and from such a typical scanner drum/head arrangement.

Figure 2:
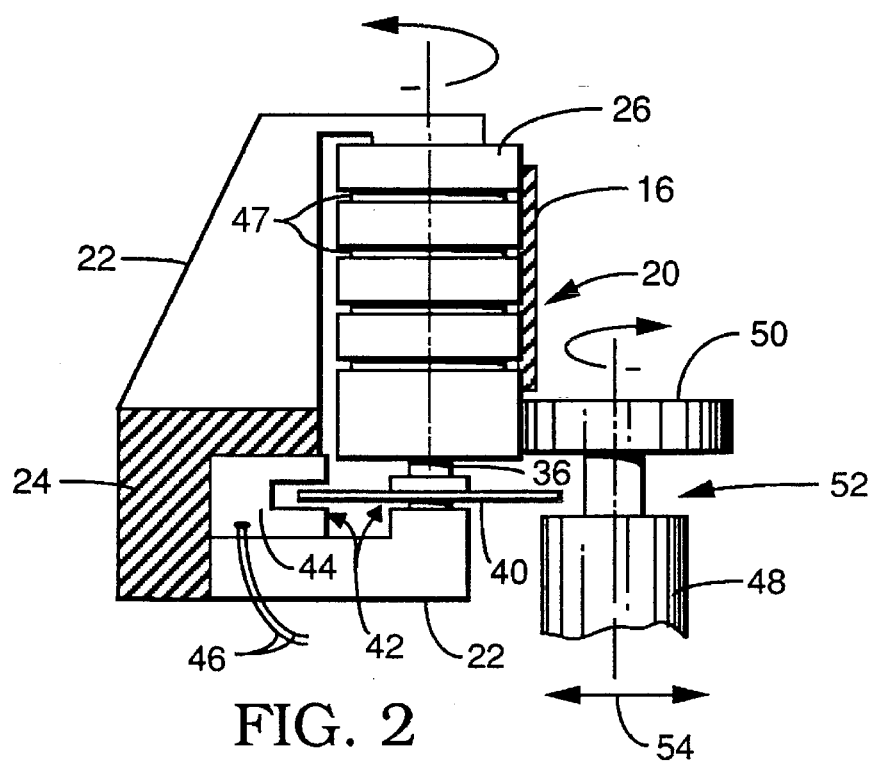
FIG. 2 is a side view of a capstan/tachometer assembly coupled to a motor/disc assembly in accordance with the invention, for driving the capstan/tachometer assembly during tach-locked modes.

FIG. 2 shows further details of the capstan/tach assembly 20 of FIG. 1, with similar elements indicated by similar numerals. The assembly includes the capstan 26 rotatably mounted via suitable bearings and a shaft 36 to a tach disc 40 of a tach means 42. The tach means 42 includes a tach pickup 44 through which the outer circular portion of the tach disc rotates. Leads 46 provide tach pulses in a manner well known in the art, to a suitable servo circuit (not shown) which pulses are indicative of the speed of rotation of the capstan 26 and thus of the media speed. The cross-section of the support member 24 is depicted secured to the support yoke 22 which in turn rotatably supports the capstan 26 and tach disc 40. The support member 24 may be pivoted, translated, etc., via the usual cams, levers, solenoids, etc., to provide the movement of the capstan/tach assembly 20 from positions A to B, and vice versa.

As may be seen from the figures, the media path is arranged so that moving the capstan/tach assembly 20 into the locked position (B) via a transport capstan threading mechanism (not shown), causes the media to be wrapped the desired angle about the capstan 26, without having to increase the wrap angle of the media about other guides, such as the guideposts 28, 30. The transport capstan threading mechanism cooperates with the other media threading mechanisms of previous mention in a manner well known in the art, to provide for controlled transport of the media between the reels 12, 14 in all modes of transport operation. The roller surface of the capstan 26 may be covered with a resilient material to improve its coefficient of friction, and/or may be formed with annular, axial, etc., grooves 47 as depicted herein so as to expel air and insure intimate contact with the media. Because of its initial position within the threading cavity 18 of the cassette 10, the capstan 26 is in contact with the non-magnetic side of the media 16. Further, unlike the typical direct-coupled capstan, the diameter of the capstan 26 need not be large. In fact, it is preferable that it is of minimum inertia to prevent slippage of the capstan against the media when a motor driving the capstan is disengaged and the media is being accelerated, as in the shuttle mode of operation.

As depicted in FIG. 2, during play, record, jog or variable speed modes where capstan control is required, a capstan motor 48 is selectively moved into contact with the capstan 26. In the embodiment of FIG. 2, a "rim drive" friction coupling technique is illustrated by way of example only, wherein the periphery of a drive disc 50 is brought into contact with the periphery of the capstan 26 by movement of the disc 50/motor 48 as a unit 52. The drive disc 50 is rotated by the capstan motor 48, whose speed in turn is controlled via a usual capstan servo circuit (not shown). The peripheral contact surface of the drive disc 50 also may be covered with a resilient material to increase the frictional coefficient between it and the capstan 26. Although movement of the disc/motor unit 52 is depicted herein by arrow 54, it is to be understood that further movement of the capstan/tach assembly 20, or movement of the disc/motor unit 52, may be used to bring them into frictional contact. Additionally, means other than the rim drive frictional contact structure of FIG. 2 may be used to rotatably drive the capstan, as further described in FIGS. 3,4.

Figure 3:
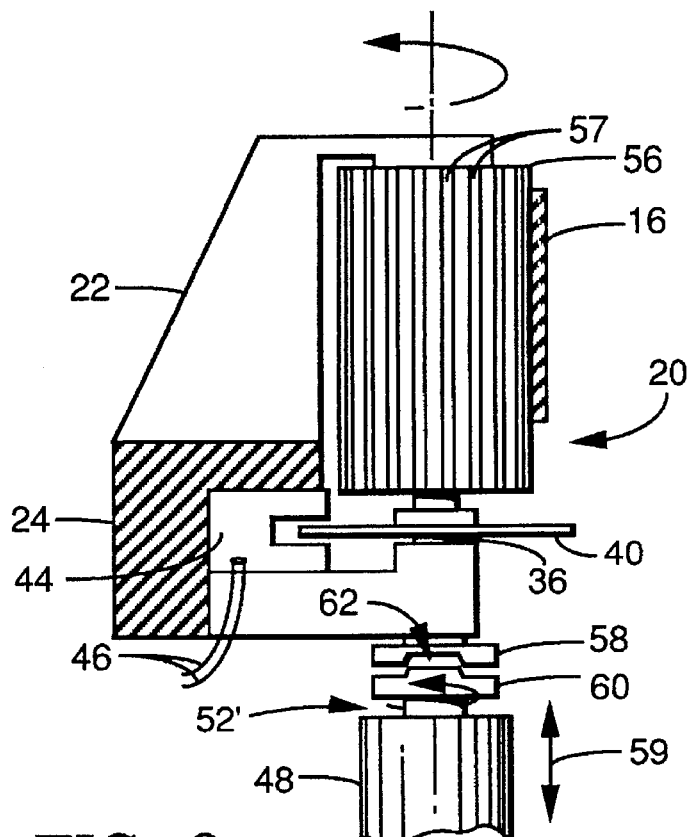
FIGS. 3 and 4 are side views of alternative embodiments of the capstan/tachometer and motor/disc assembly of FIG. 2.

To this end, FIG. 3 depicts by way of example an alternative configuration for the capstan as well as for the disc/motor unit 52'. An alternative capstan 56 is similar in size and shape to capstan 26 of FIG. 2 wherein however the tape contacting surface is formed with slots 57 formed in the circumferential surface of the capstan in an axial direction. The axial slots 57 are an alternative to the annular slots 47 of FIG. 1 and provide for dispersing the air film generated between the media and the capstan surface.

In FIG. 3, the disc/motor unit 52' engages the capstan/tach assembly 20 by movement along an axial direction (arrow 59) relative to the axis of the capstan/tach assembly, rather than by movement of the disc/motor unit in a sideways direction as in FIG. 1. More particularly, the shaft 36 supporting the capstan 56 and tach disc 40 extends through the bearing in the lower portion of the yoke 22 to allow securing a circular drive plate 58 thereto for rotation with the shaft 36. A matching circular drive plate 60 is coaxially secured to the shaft of the motor 48, and is suitably adapted to engage the plate 58 upon axial movement of the disc/motor unit 52', to impart the motor rotation to the capstan/tach assembly 20. Thus, the facing surfaces of the plates 58, 60 may have a resilient material deposited thereon to provide a high frictional contact, may be radially slotted to provide a positive meshed or locked coupling between the plates, etc. Intermeshing cone shapes 62 may be provided about the axes of the plates to provide precise alignment of the shaft of the motor 48 with the shaft 36.

Figure 4:
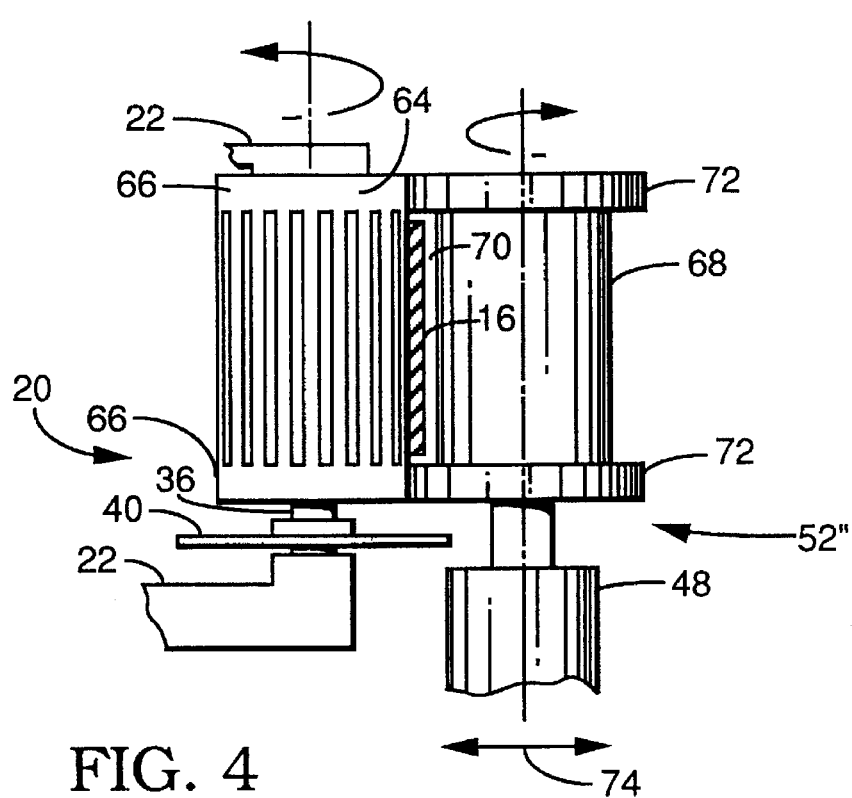

FIG. 4 depicts a further alternative embodiment for coupling the capstan/tach assembly 20 to the motor 48. A capstan 64 may include axial or annular, etc., slots in the peripheral surface thereof as desired. However, the uppermost and lowermost cylindrical extremities of the capstan should be smooth and precisely concentric as depicted at circumferential ends 66 thereof. A cylindrical drive spool 68 of a length corresponding herein to the length of the capstan 64, is secured to the shaft of the motor 48 for rotation therewith. A central portion of the spool's circumference is removed to provide an annular recess 70 in the region thereof adjacent to the media 16 to prevent contact therewith. Contact of the drive spool 68 with the capstan 64 is provided via annular disc portions 72 at the ends of the spool, which portions 72 are in register with respective smooth circumferential ends 66 of the capstan 64. As in FIG. 2, sideways (radial) movement of unit 52" formed of the spool 68/motor 48 in the direction of arrow 74, urges the disc portions 72 of the spool into rim drive frictional contact at both ends of the capstan 64 to provide optimum rotational stability between the spool and capstan.

Although the present invention has been described herein relative to various embodiments thereof, it is to be understood that further features and modifications to the combination are contemplated by the invention. These features and advantages will be apparent from the description and drawings, and thus the scope of the invention is defined by the following claims and their equivalents.

What is claimed is:

1. A capstan assembly for driving a flexible web in response to a motor and/or for rotation with the flexible web; comprising:

a capstan for engaging the web;

support means rotatably supporting the capstan for moving the capstan from a first position removed from said motor to approach a second position adjacent the motor which provides the engagement with the web;

tachometer means mounted in the support means for rotation with and movement with the capstan; and said tachometer means being continuously rotated with movement of the web when the capstan and tachometer means are in the second position.

2. The capstan assembly of claim 1 including a web cassette wherein:

said capstan is supported in the first position within the web cassette by the support means, and the capstan carries the web from within the web cassette to the second position in response to movement of the support means.

3. The capstan assembly of claim 2 wherein movement of the capstan to the second position wraps the web about the capstan on the order of from 90 to 180 degrees.

4. The capstan assembly of claim 1 wherein:

said motor is stationary in its location and rotatably engages the capstan when the capstan is in the second position to cause the capstan to drive the web in response to the motor.

5. The capstan assembly of claim 4 further comprising:

means for providing further relative movement between the capstan and the motor to cause the rotational engagement between the capstan and motor when the capstan is in the second position.

6. The capstan assembly of claim 5 including:

drive disk means rotatably coupled to the motor and including a resilient peripheral surface which frictionally is coupled to the capstan in response to the providing means when the capstan is in the second position.

7. The capstan assembly of claim 6 wherein the capstan terminates axially in cylindrical ends, and the drive disk means comprises a spool terminating axially in cylindrical ends configured for frictional engagement with respective cylindrical ends of the capstan when the capstan is in the second position.

8. The capstan assembly of claim 4 including:

a first drive member rotatable with the capstan; and a second drive member rotatably coupled to the motor and adapted to engage the first drive member when the capstan is in said second position.

9. The capstan assembly of claim 4 wherein the support means includes:

a support yoke;

a shaft rotatably mounted within the support yoke for rotatably supporting the capstan and the tachometer means; and a support member secured to the support yoke for moving the capstan and tachometer means from the first to the second position, and vice versa.

10. A capstan assembly for transporting a magnetic media and the like, comprising:

a rotatable capstan;

tachometer means integral with said capstan for rotation therewith;

drive motor means separate from said capstan and tachometer means; and means for moving said capstan and tachometer means as a unit from a media unthreaded position removed from the drive motor means, to a media threaded position commensurate with the location of the drive motor means wherein the capstan is in rotatable contact with the media, and the integral tachometer means continuously provides media speed information.

11. The capstan assembly of claim 8 wherein the drive motor means is in a stationary location, the capstan carries the media to the media threaded position and the capstan and tachometer means unit is rotatably engagable to the drive motor means when said unit is in the media threaded position.

12. The capstan assembly of claim 11 including:

drive coupling means secured for rotation with the drive motor means, said drive coupling means being adapted to couple the rotation of the motor to the capstan and tachometer means unit when the unit is in the media threaded position.

13. The capstan assembly of claim 12 wherein said drive coupling means includes a circular drive member having a periphery which is frictionally coupled to the capstan.

14. The capstan assembly of claim 13 wherein the circular drive member includes a drive spool having a pair of peripheries frictionally coupled to the capstan.

15. The capstan assembly of claim 12 wherein said drive coupling means includes a first member rotatably coupled to the capstan and a second member rotatably coupled to the motor, said first and second members being engageable when said unit is in the media threaded position.

16. The capstan assembly of claim 11 including:

a support member for supporting the capstan and tachometer means unit in the media unthreaded position and for moving said unit and the media to said media threaded position, and vice versa.

17. The capstan assembly of claim 16 wherein the support member includes:

a support yoke for rotatably supporting the capstan and tachometer means; and a pivotable support arm secured to the support yoke for moving the capstan and tachometer means unit and the media between the media unthreaded and the media threaded positions.

* * * * *